United States Patent
Maeda

(10) Patent No.: US 8,138,468 B2
(45) Date of Patent: Mar. 20, 2012

(54) ROTARY DISK ECCENTRICITY MEASUREMENT METHOD, ROTARY ENCODER, AND IMAGE FORMING APPARATUS INCLUDING THE ROTARY ENCODER

(75) Inventor: Kenji Maeda, Isehara (JP)

(73) Assignee: Ricoh Company, Ltd., Tokyo (JP)

( * ) Notice: Subject to any disclaimer, the term of this patent is extended or adjusted under 35 U.S.C. 154(b) by 315 days.

(21) Appl. No.: 12/611,219

(22) Filed: Nov. 3, 2009

(65) Prior Publication Data

US 2010/0124155 A1    May 20, 2010

(30) Foreign Application Priority Data

Nov. 20, 2008 (JP) ................................. 2008-296818

(51) Int. Cl.
*G01D 5/34* (2006.01)
(52) U.S. Cl. ............... 250/231.13; 250/231.18; 33/1 PT
(58) Field of Classification Search ............. 250/231.13, 250/231.14, 231.16–231.18; 33/1 PT, 550; 356/614, 617
See application file for complete search history.

(56) References Cited

U.S. PATENT DOCUMENTS
2010/0061003 A1 * 3/2010 Yanata ............................ 360/31

FOREIGN PATENT DOCUMENTS

| JP | 1-276019 | 11/1989 |
|----|----------|---------|
| JP | 7-234103 | 9/1995 |
| JP | 2715562 | 11/1997 |
| JP | 2001-227990 | 8/2001 |
| JP | 2001-264119 | 9/2001 |
| JP | 3683375 | 6/2005 |
| JP | 2007-183255 | 7/2007 |

* cited by examiner

*Primary Examiner* — Kevin Pyo
(74) *Attorney, Agent, or Firm* — Cooper & Dunham LLP

(57) ABSTRACT

An eccentricity measurement method of measuring the eccentricity of a rotary disk of a rotary encoder includes forming, on the rotary disk, at least one first straight-line pattern group in a different radial direction including a plurality of straight-line patterns that are equally spaced in the radial direction and extend in a normal line direction from a base point a predetermined distance away from a center of a radial scale of the rotary disk; placing the rotary disk on a table including at least one second straight-line pattern group including straight-line patterns; and measuring the amount and the direction of the eccentricity of the rotary disk in accordance with the position of the straight-line pattern of the first straight-line pattern group that coincides with the position of the straight line pattern of the second straight-line pattern group in the radial direction.

15 Claims, 10 Drawing Sheets

ENCODER
OUTPUT SIGNAL

ROTARY DISK ECCENTRICITY MEASUREMENT METHOD, ROTARY ENCODER, AND IMAGE FORMING APPARATUS INCLUDING THE ROTARY ENCODER

CROSS-REFERENCE TO RELATED APPLICATIONS

This patent application is based on and claims priority pursuant to 35 U.S.C. §119 from Japanese Patent Application No. 2008-296818 filed on Nov. 20, 2008 in the Japan Patent Office, which is hereby incorporated herein by reference in its entirety.

BACKGROUND OF THE INVENTION

1. Field of the Invention

Exemplary aspects of the present invention generally relate to a method of measuring the difference between the rotational center of a rotary disk of a rotary encoder and the center of a radial scale provided on the rotary disk to detect an amount of rotational eccentricity, and an image forming apparatus including the rotary encoder.

2. Description of the Background Art

One example of a device that detects a rotational state of a rotary member, in particular such characteristics as rotation speed and amount of rotation thereof (i.e., angle of rotation), is a photoelectric rotary encoder. as rotation speed and amount of rotation thereof (i.e., angle of rotation), is a photoelectric rotary encoder.

In the photoelectric rotary encoder, the periphery of a disk connected to the shaft of the rotary member is provided with a radial scale including alternating light-transmitting portions and light-blocking portions, or light-reflecting portions and light-absorbing portions. A light projector projects a light flux (a light beam) onto the radial scale, and light reflected by or transmitted through the radial scale is detected by a detection device. Then, using signals from the detection device, the rotational state of the rotary disk is identified.

In general, the detection accuracy of the above-described rotary encoder decreases significantly if the center of rotation of the rotary disk and the center of the radial scale are not properly aligned. Obviously, such reduction in detection accuracy can be prevented by properly aligning the center of rotation of the rotary disk and the center of the radial scale, and to accomplish that the accuracy of manufacturing and assembly of the radial scale and the center of rotation of the rotary disk may be enhanced, as in certain known techniques. Alternatively, the radial scale may be attached to the rotary shaft while the center of the rotary disk or the radial scale and the center of rotation of the rotary shaft are adjusted with the use of a microscope or the like, as in other background techniques.

If the accuracy of the manufacturing and assembly of the radial scale and the center of rotation of the rotary disk is increased, adjustment is unnecessary in the assembly or replacement of components, and thus the assembly work is simplified. However, to achieve such relatively high accuracy is expensive. This is because it is difficult to assemble and adjust the rotary disk and the rotary shaft, and thus it takes a relatively long time for the assembly and adjustment.

FIG. 20 is a diagram illustrating an example of post-production measurement of eccentricity of a rotary disk according to a background technique.

A rotary disk 300 illustrated in FIG. 20 includes a mounting portion 301 and a radial scale 302. The mounting portion 301, which is a hole near the center of the rotary disk 300 shown in FIG. 20, is used to attach the rotary disk 300 to a detected object, for example, a rotary member such as a roller.

To calculate the center of rotation c1 of the rotary disk 300, the coordinates of an arbitrary point on the circumference of the mounting portion 301 are first measured at least three locations (for example, three locations in the drawing). On the basis of the measured coordinates, the coordinates of the center of rotation c1 of the rotary disk 300 can be calculated.

Subsequently, to calculate the center c2 of the radial scale 302, the coordinates of an arbitrary point p2 on the circumference of a circle pattern 303 drawn concentrically with the radial scale 302 are measured at least three locations (for example, the three locations in the drawing). On the basis of the measured coordinates, the coordinates of the center c2 of the radial scale 302 can be calculated.

The previously calculated coordinates of the center of rotation c1 of the rotary disk 300 are then compared with the coordinates of the center c2 of the radial scale 302 to obtain an eccentricity amount D, if such is present.

Ultimately, whether or not the obtained eccentricity amount D meets a separately set standard is checked, and whether or not the rotary disk 300 can be used is determined.

With this configuration, the assembly time for the rotary disk can be reduced, and no adjustment tool is necessary even if the rotary disk needs to be replaced when the rotary disk fails. Furthermore, the time for measuring the eccentricity amount can also be reduced.

However, in the above-described eccentricity measurement method, in order to perform accurate measurement, it is necessary to accurately select the respective measurement points p1 and p2 without misalignment. In order to accurately select the measurement points, the expertise of a measurer and complicated image processing by a measuring device are necessary. As a result, the time for completing the measurement is increased.

SUMMARY OF THE INVENTION

In view of the foregoing, an eccentricity measurement method of measuring eccentricity between a center of a radial scale of a rotary disk formed around a peripheral portion of the rotary disk and a center of a connection portion of the rotary disk for connecting the rotary disk to a rotary shaft of a measured object includes forming, on the rotary disk, at least one first straight-line pattern group in different radial directions; forming, on a table comprising a projection that engages the connection portion of the rotary disk, at least one second straight-line pattern group; placing the rotary disk on the table such that the first straight-line pattern group and the second straight-line pattern group on the table are parallel to each other; and measuring an amount and direction of the eccentricity of the rotary disk using the position of the straight-line pattern of the first straight-line pattern group that coincides with the position of the straight line pattern of the second straight-line pattern group in the radial direction. The first straight-line pattern group includes a plurality of straight-line patterns equally spaced radially and extending in a normal line direction from a base point a predetermined distance away from the center of the radial scale. The second straight-line pattern group includes the same number of the plurality of straight-line patterns as the straight-line patterns of the first straight-line pattern group in the same radial direction as that of the first straight-line pattern group from a base point the predetermined distance away from the center of an outer diameter of the projection at a pitch different from the pitch of the first straight-line pattern group. A central portion of the rotary disk includes the connection portion.

In another illustrative embodiment of the present invention, an eccentricity measurement method of measuring eccentricity between a center of a radial scale of a rotary disk formed along a peripheral portion of the rotary disk and a center of a connection portion of the rotary disk for connecting the rotary disk to a rotary shaft of a measured object includes forming, on the rotary disk, a plurality of equally spaced first circle patterns concentric with the radial scale from a base point a predetermined distance away from the center of the radial scale; forming, on a table comprising a projection that engages the connection portion of the rotary disk, the same number of second circle patterns as that of the first circle patterns, concentric with the first circle patterns at a pitch different from the pitch of the first circle patterns from a base point the predetermined distance away from the center of an outer diameter of the projection; placing the rotary disk on the table; and measuring an amount and direction of the eccentricity of the rotary disk using the position of the first circle pattern that coincides with the second circle pattern. The central portion of the rotary disk includes the connection portion.

Yet in another illustrative embodiment of the present invention, an eccentricity measurement method of measuring an eccentricity between a center of a radial scale of a rotary disk formed at a peripheral portion of the rotary disk and a center of a connection portion of the rotary disk for connecting the rotary disk to a rotary shaft of a measured object includes forming, on the rotary disk, at least one first arc-shape pattern group in different radial directions; forming, on a table comprising a projection that engages the connection portion of the rotary disk, at least one second arc-shape pattern group; placing the rotary disk on the table such that the base point of the first arc-shape pattern group coincides with the base point of the second arc-shape pattern group; and measuring an amount and direction of the eccentricity of the rotary disk using the position of the arc-shape pattern of the first arc-shape pattern group in the radial direction that corresponds to the arc-shape pattern of the second arc-shape pattern group. The first arc-shape pattern group includes a plurality of arc-shape patterns equally spaced radially and extending in a normal line direction from a base point a predetermined distance away from the center of the radial scale. The second arc-shape pattern group includes the same number of the plurality of the arc-shape patterns as that of the first arc-shape pattern group in the same radial direction as that of the arc-shape patterns of the first arc-shape pattern group at a pitch different from the pitch of the arc-shape patterns of the first pattern group from a base point the predetermined distance away from the center of an outer diameter of the projection. A central portion of the rotary disk includes the connection portion.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF ILLUSTRATIVE EMBODIMENTS

Figure 1:
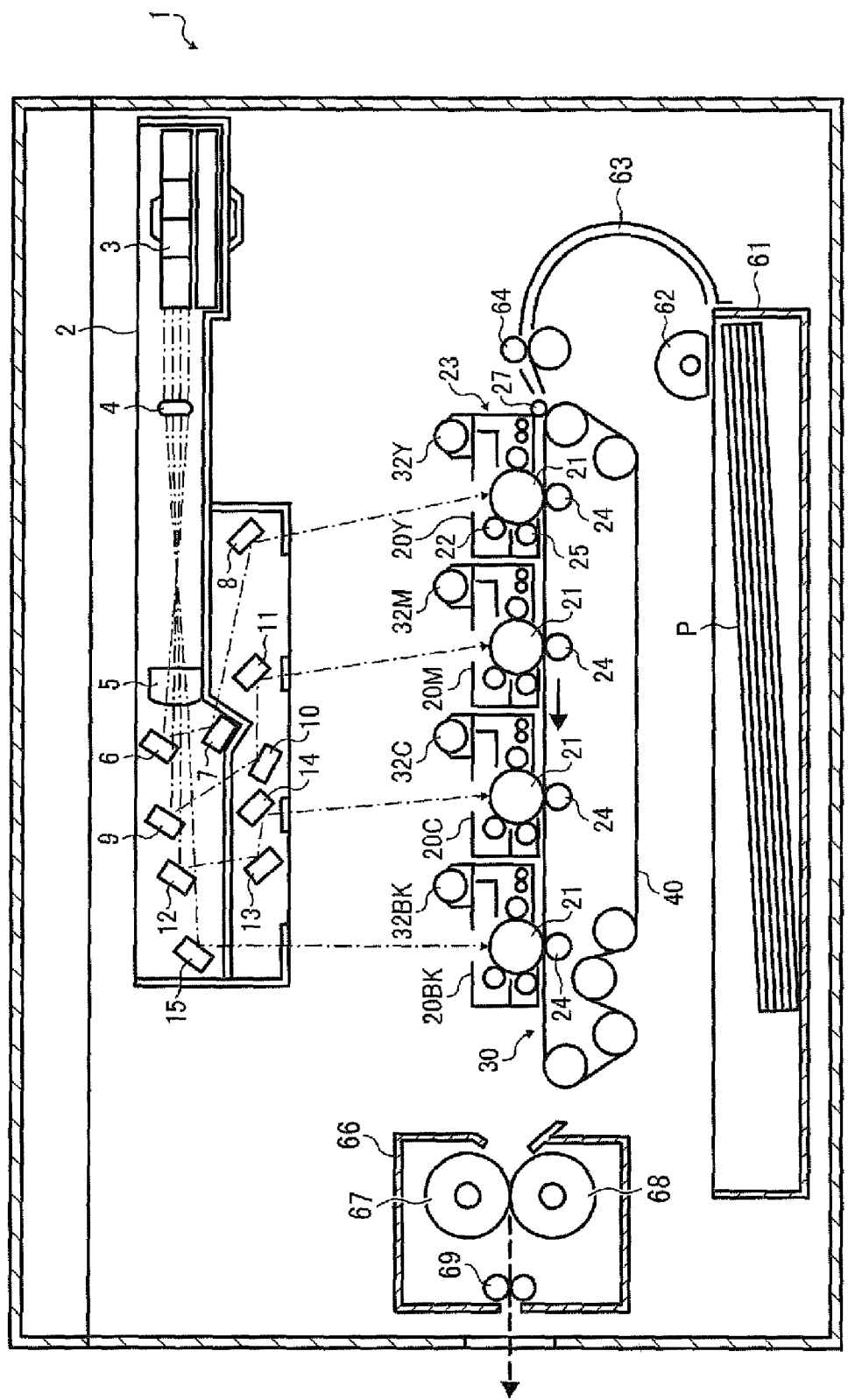
FIG. 1 is a schematic diagram illustrating an image forming apparatus in which a rotary encoder according to an illustrative embodiment of the present invention is employed.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and alternative example, for the sake of simplicity of drawings and descriptions, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Referring now to the drawings, wherein like reference numerals designate identical or corresponding parts throughout the several views, and initially to FIG. 1, one example of an image forming apparatus according to an illustrative embodiment of the present invention is described.

FIG. 1 is a schematic diagram illustrating a color printer as an example of the image forming apparatus 1 in which a rotary encoder according to the illustrative embodiment is employed.

In FIG. 1, the image forming apparatus 1 includes an optical unit 2 (writing unit) that emits a laser beam based on image information, process cartridges 20Y, 20M, 20C, and 20BK, photoreceptor drums 21 serving as image bearing members, charging devices 22, developing devices 23, transfer rollers 24, cleaning devices 25, a transfer belt unit 30 including a transfer belt 40, toner supply units 32Y, 32M, 32C, and 32BK, a sheet feed unit 61, and a fixing unit 66.

It is to be noted that reference characters Y, M, C, and BK denote colors yellow, magenta, cyan, and black, respectively.

The process cartridges 20Y, 20M, 20C, and 20BK correspond to the colors yellow, magenta, cyan, and black, respectively. Each of the process cartridges 20Y, 20M, 20C, and 20BK includes the photoreceptor drum 21 and the developing device 23.

The charging devices 22 charge the surface of the photoreceptor drums 21. The developing devices 23 develop an electrostatic latent image formed on the photoreceptor drums 21. The transfer rollers 24 contact the inner surface of the belt loop of the transfer belt 40. The cleaning devices 25 recover toner that is not transferred thus remaining on the photoreceptor drums 21. The transfer belt unit 30 serving as a belt conveyer includes the transfer belt 40 that transfers toner images formed on the photoreceptor drums 21 onto a transfer material P. The toner supply units 32Y, 32M, 32C, and 32BK supply a respective color of toner to the developing devices 23. The sheet feed unit 61 stores the transfer material P such as a plurality of recording media sheets. The fixing unit 66 fixes an unfixed image on the transfer material P.

Each of the process cartridges 20Y, 20M, 20C, and 20BK integrally includes image forming components such as the photoreceptor drum 21, the charging device 22, the developing device 23, and the cleaning device 25. Images of yellow, magenta, cyan, and black are formed on the photoreceptor drums 21 of the respective color of the process cartridges 20Y, 20M, 20C, and 20BK.

Figure 2:
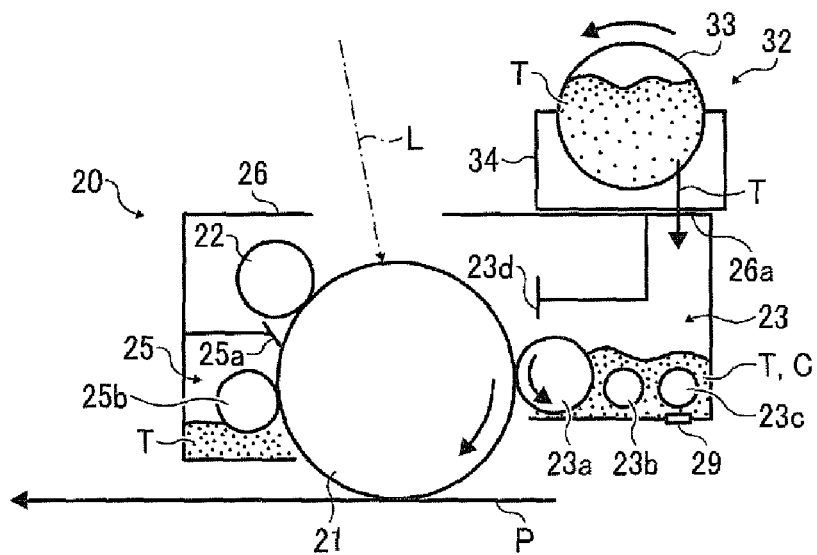
FIG. 2 is a schematic diagram illustrating one of multiple process cartridges of the image forming apparatus of FIG. 1.

Referring now to FIG. 2, a description is provided of a normal color image forming operation. FIG. 2 is a schematic diagram illustrating one of the process cartridges 20Y through 20BK in the image forming apparatus 1. The process cartridges 20Y through 20BK all have the same configuration as all the others, differing only in the color of toner employed.

Four photoreceptor drums 21 of the process cartridges 20 rotate in the clockwise direction as illustrated in FIG. 2. The surface of the photoreceptor drum 21 is evenly charged by the charging device 22 opposite the photoreceptor drum 21. Subsequently, a charging potential is formed on the surface of the photoreceptor drum 21. Then, the surface thereof reaches an irradiation position of the laser beam.

Referring back to FIG. 1, the optical unit 2 of FIG. 1 includes an LD light source. The LD light source emits the laser beam corresponding to an image signal of each color. The laser beam incidents upon a polygon mirror 3 and is reflected. Subsequently, the laser beam penetrates through lenses 4 and 5.

After penetrating through the lenses 4 and 5, the laser beam having different color components of yellow, magenta, cyan, and black passes separate optical paths. The laser beam corresponding to the yellow component is reflected by mirrors 6 through 8 and illuminates the surface of the photoreceptor drum 21 of the process cartridge 20Y that is the first process cartridge from the right in FIG. 1.

The laser beam corresponding to the yellow component is deflected by the polygon mirror 3 rotating at high-speed, thereby scanning the photoreceptor drum 21 in a direction of a rotary shaft (main scan direction). Accordingly, after the photoreceptor drum 21 is charged by the charging device 22, the electrostatic latent image of the yellow component is formed on the photoreceptor drum 21.

Similarly, the laser beam corresponding to the magenta component is reflected by the mirrors 9 through 11 and illuminates the surface of the photoreceptor drum 21 of the process cartridge 20M that is the second process cartridge from the right in FIG. 1. Accordingly, the electrostatic latent image having the magenta component is formed.

The laser beam corresponding to the cyan component is reflected by the mirrors 12 through 14 and illuminates the surface of the photoreceptor drum 21 of the process cartridge 20C that is the third process cartridge from the right in FIG. 1. Accordingly, the electrostatic latent image having the cyan component is formed.

The laser beam corresponding to the black component is reflected by the mirror 15 and illuminates the surface of the photoreceptor drum 21 of the process cartridge 20BK that is the fourth process cartridge from the right in FIG. 1. Accordingly, the electrostatic latent image having the black component is formed.

The surfaces of the photoreceptor drums 21 on which the electrostatic latent image of respective color is formed rotate and arrive at a position facing the developing device 23. Subsequently, respective color of toner is supplied from the developing device 23 onto the photoreceptor drum 21, thereby developing the latent image on the photoreceptor drum 21.

After the development process, the surface of the photoreceptor drum 21 arrives at the position facing the transfer belt 40 (belt member).

The transfer roller 24 is disposed opposite each of the photoreceptor drums 21 and contacts the inner surface of the transfer belt 40. Toner images of each color formed on the photoreceptor drums 21 are sequentially transferred onto the transfer material P transported by the transfer belt 40.

The transfer belt 40 is stretched and supported by a drive roller and a plurality of the driven rollers. The transfer belt 40 is rotated by the drive roller in the direction of arrow in FIG. 1. A detailed description of the transfer belt unit 30 including the transfer belt 40 is provided later.

After the transfer process, the surface of the photoreceptor drum 21 arrives at the position opposite the cleaning device 25. Residual toner remaining on the photoreceptor drum 21 is recovered by the cleaning device 25. Subsequently, the surface of the photoreceptor drum 21 passes through a charge neutralizing device, not illustrated, thereby neutralizing charge on the photoreceptor drum 21 in preparation for the subsequent imaging cycle and completing a sequence of image forming process.

Meanwhile, the transfer material P is fed by a sheet feed roller 62 from the sheet feed unit 61. The transfer material P passes a transport guide 63 and is directed to a pair of registration rollers 64.

The transfer material P directed by the registration rollers 64 is sent to a contact portion, at which the transfer belt 40 and a suction roller 27 contact, in appropriate timing. Subsequently, while the transfer material P is transported by the transfer belt 40 rotating in the direction of arrow in FIG. 1, the transfer material P passes in front of four photoreceptor drums 21. Accordingly, the toner images of different color are overlappingly transferred on the transfer material P, thereby forming a color image.

The transfer material P on which the color image is formed separates from the transfer belt 40 and is directed to the fixing device 66. In the fixing unit 66, a heating roller 67 and a pressure roller 68 define a nip portion where the heating roller 67 and the pressure roller 68 contact and press against each other and the color image is fixed on the transfer material P. After the fixing process, the transfer material P is discharged outside the image forming apparatus 1 as an output image, thereby completing a sequence of image forming process.

Referring back to FIG. 2, a description is provided of the process cartridge serving as an image forming portion of the image forming apparatus 1. It is to be noted that four process cartridges 20Y, 20M, 20C, and 20BK all have the same configuration, differing only in the color of toner employed. Thus, to simplify the description, the reference characters Y, M, C, and BK indicating colors are omitted herein unless otherwise specified.

As described above, as illustrated in FIG. 2, the process cartridge 20 integrally includes mainly the photoreceptor drum 21, the charging device 22, the developing device 23 and the cleaning device 25 in a casing 26.

The developing device 23 includes a developing roller 23a, two mixing rollers 23b and 23c, a doctor blade 23d, a toner concentration sensor 29, and so forth. Inside the developing device 23, a developer consisting of a carrier C and a toner T is stored.

The cleaning device 25 includes a cleaning blade 25a and a cleaning roller 25b, both of which contact the photoreceptor drum 21.

A description is now provided of the image forming process. The developing roller 23a rotates in a direction of arrow in FIG. 2. The toner T inside the developing device 23 is mixed with a fresh toner T supplied from the toner supply unit 32 and the carrier C by the mixing rollers 23b and 23c.

The frictionally charged toner T is supplied to the developing roller 23a together with the carrier C by the mixing roller 23b. It is to be noted that the toner T in a toner bottle 33 is supplied from a supply opening 26a to the developing device 23 as the toner T in the developing device 23 is consumed.

Consumption of the toner T in the developing device 23 is detected by the toner concentration sensor 29 disposed in the developing device 23. The toner T borne on the developing roller 23a passes the doctor blade 23d and arrives at a position opposite the photoreceptor drum 21, that is, a developing region. At the developing region, the toner T sticks to the electrostatic latent image formed on the surface of the photoreceptor drum 21.

A difference in a potential between the potential of a latent image area illuminated with the laser beam L and a developing bias supplied to the developing roller 23a generates an electric field that causes the toner T to stick to the surface of the photoreceptor drum 21. Accordingly, most of the toner T adhered to the photoreceptor drum 21 is transferred onto the transfer material P.

The residual toner T remaining on the photoreceptor drum 21 is recovered to the cleaning device 25 by the cleaning blade 25a and the cleaning roller 25b.

Figure 3:
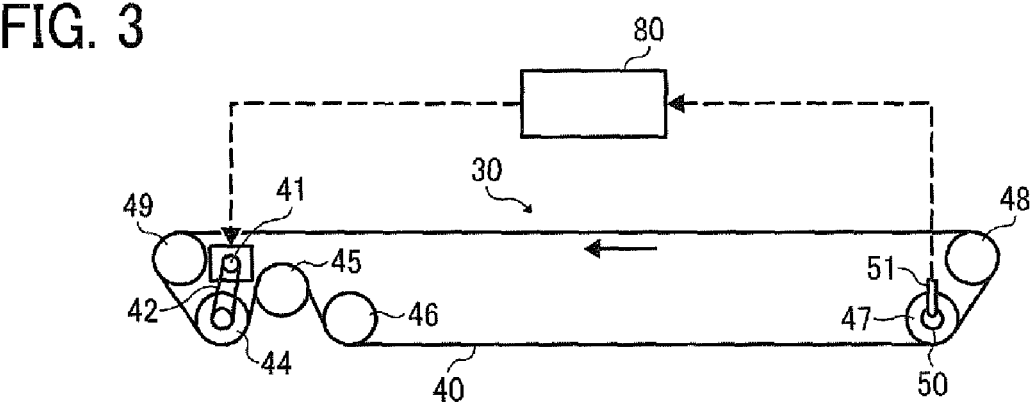
FIG. 3 is a cross-sectional schematic view of a transfer belt unit serving as a belt conveyer, according to an illustrative embodiment of the present invention.

Referring now to FIG. 3, there is provided a cross-sectional schematic view of the transfer belt unit 30 serving as a belt conveyance device. As illustrated in FIG. 3, the transfer belt unit 30 includes the transfer belt 40 serving as the belt member, a drive roller 44, a plurality of the driven rollers 45 through 49, and a drive motor 41. A reference numeral 80 refers to a controller, and 51 refers to a transmissive photosensor serving as an encoder sensor.

The transfer belt 40 is stretched and supported by the drive roller 44 and the plurality of the driven rollers 45 through 49. A drive force of the drive motor 41 is transmitted to the drive roller 44 via a drive belt 42. When the drive roller 44 rotates in a counterclockwise direction, the transfer belt 40 wound partially around the peripheral surface of the drive roller 44 is rotated in the direction of arrow in FIG. 3.

The plurality of the driven rollers 45 through 49 contacts the transfer belt 40 that moves in the direction of arrow, and is rotated in the counterclockwise direction. One of the plurality of the driven rollers 45 through 49, that is, the driven roller 47 (a roller member), is provided integrally with a rotary encoder.

Figure 4:
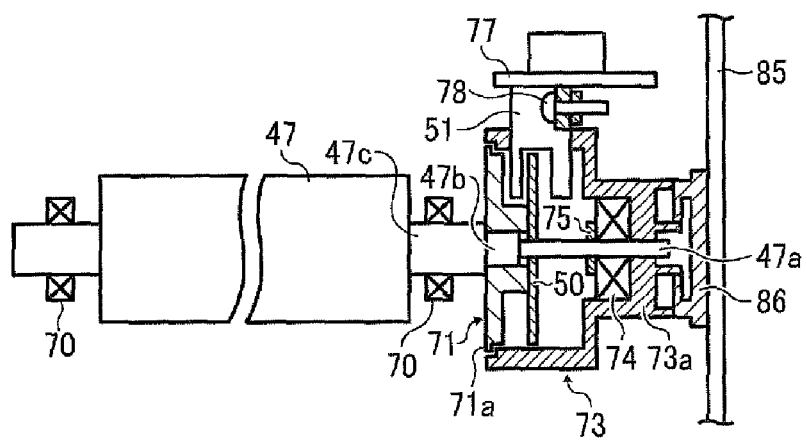
FIG. 4 is a cross-sectional schematic view of a driven roller disposed in the transfer belt unit of FIG. 3 as viewed from a shaft direction.

Referring now to FIG. 4, there is provided a cross-sectional schematic view of the driven roller 47 of the transfer belt unit 30 as viewed from a shaft direction.

In FIG. 4, the driven roller 47 serving as the roller member includes a roller main body and shaft portions 47a through 47c. Shaft bearings 70 are provided at both ends of the shaft of the driven roller 47. The driven roller 47 is supported by the transfer belt unit 30 via the shaft bearings 70.

At one side of the driven roller 47, that is, the side at which a rotary encoder is mounted, the shaft portions 47a through 47c with different outer diameters are formed. The driven roller 47 may be formed of stainless steel or the like.

The rotary encoder includes the rotary disk 50, the transmissive photosensor 51 serving as an encoder sensor, a support plate 71 serving as a support member, a cover 73, and so forth. On the shaft portion 47a of the driven roller 47, the cover 73 is rotatably supported through the shaft bearing 74.

The shaft bearing 74 is a ball bearing. The peripheral portion (outer ring portion) thereof is press-fitted into a hole of the cover 73. The inner peripheral portion (inner ring portion) of the shaft bearing 74 is fitted with the shaft portion 47a.

Figure 5:
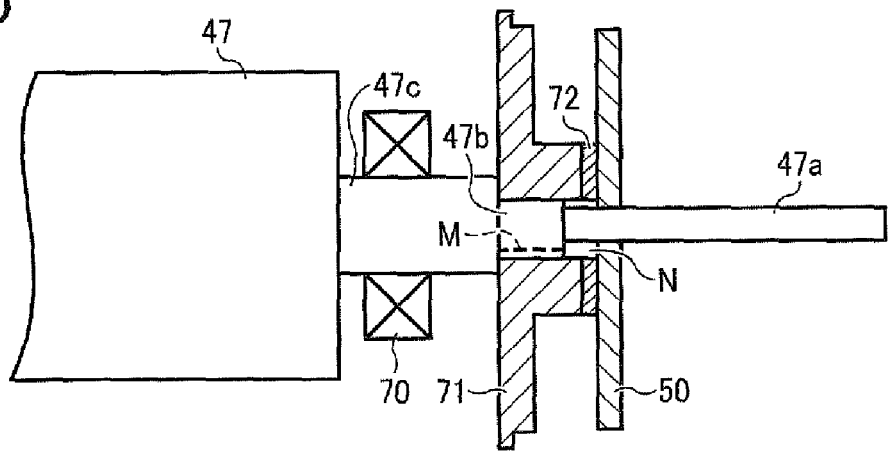
FIG. 5 is a schematic diagram illustrating a rotary disk of the rotary encoder according to an illustrative embodiment of the present invention.

The cover 73 provided integrally with the shaft bearing 74 is inserted to the driven roller 47 from the right in FIG. 5. The shaft bearing 74 contacts a stopper 75 provided to the shaft portion 47a so that the shaft bearing 74 is positioned in a shaft direction toward a support plate 50.

Thrust backlash of the cover 73 in the shaft direction can be eliminated by an engagement member 86 fixed to a side panel 85 of the transfer belt unit 30. The engagement member 86 is formed of resin and engages an end portion of the cover 73 after the cover 73 is inserted to the shaft portion 47a. Furthermore, a projection 73a of the cover 73 engages a groove formed in the inner peripheral portion of the engagement portion 86, thereby stopping rotation of the cover 73. When the engagement member 86 urges the cover 73 toward the support plate 71, rattling of the cover 73 in the shaft direction can be prevented.

An opening is formed at the end portion of the cover 73 (the left end portion in FIG. 4). The support plate 71 is inserted in the opening such that a slight gap is formed between the opening and the support plate 71.

As illustrated in FIG. 4, substantially above the cover 73, the transmissive photosensor 51 is disposed via a hole, not illustrated, for installation. The support plate 71, the rotary disc 50, the stopper 75, the cover 73, and the shaft bearing 74 are sequentially inserted to the shaft portion of the roller 47. Subsequently, the transmissive photosensor 51 fixed to a board 77 is mounted to the cover 73.

The transmissive photosensor 51 is mounted to the cover 73 using a nylon rivet 78 as a resin rivet. More specifically, the photosensor 51 integrally provided with the board 77 is mounted from substantially above the cover 73. A through hole provided to the cover 73 and an elongate hole provided to a holding portion of the photosensor 51 are aligned. After the vertical position of the photosensor 51 is adjusted, the position of the photosensor 51 on the cover 73 is fixed by the nylon rivet 78.

Referring now to FIG. 5, there is provided a partially enlarged schematic view of the rotary disk 50 of the rotary encoder according to the illustrative embodiment. The support plate 71 is formed of resin material such as polyacetal and press-fitted (lightly press-fitted) to the shaft portion 47b of the driven roller 47. In FIG. 5, a letter symbol M refers to a press-fitting area, and N refers to an area that is not press-fitted.

The position of the support plate 71 in the shaft direction is determined by a step portion formed by the shaft portions 47b and 47c, the outer diameters of which are different. The rotary disk 50 is attached to an end surface of the support plate 71 at one side (the opposite side in the direction of press-fitting) by a double-sided tape 72.

Figure 6:
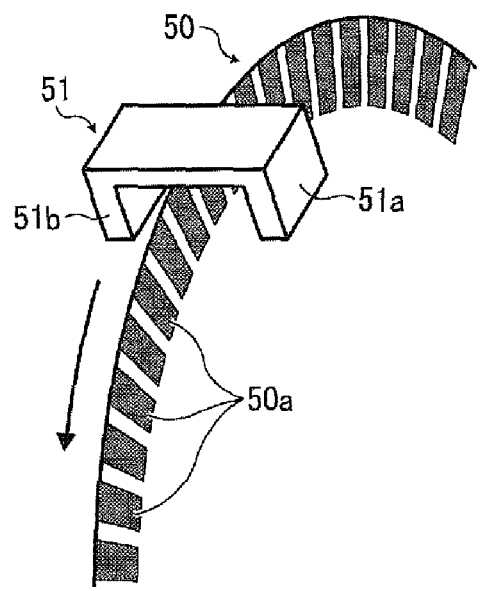
FIG. 6 is a partially enlarged schematic diagram of the rotary disk according to the illustrative embodiment.

Referring now to FIG. 6, there is provided a partially enlarged schematic diagram of the rotary disk 50 according to the illustrative embodiment. As illustrated in FIG. 6, the rotary disk 50 is formed of a transparent flexible material such as polyethylene terephthalate (PET) having a thickness of approximately 0.2 mm. A radial code portion 50a (black patterns) is formed on the circumference side of the main surface of the rotary disk 50. In other words, a light-transmitting area and a light-blocking area 50a are alternately and radially formed.

The code portion 50a of the rotary disk 50 is formed using a pattern drawing technique such as photolithography, photoresist, and etching. When the photosensor 51 detects the code portion 50a on the rotary disk 50, rotation of the driven roller 47 provided integrally with the rotary disk 50 (the support plate 71) is recognized.

In other words, the rotary disk 50 is disposed such that a portion of the periphery of the rotary disk 50 is sandwiched between a light-emitting portion 51a (a light emitting element or a light projector) of the transmissive photosensor 51 and the light receiving portion 51b (a light receiving element or a light detector).

When the code portion 50a (black patterns) is between the light emitting portion 51a and the light receiving portion 51b, the light receiving portion 51b does not receive the projected light from the light emitting portion 51a and the output of the light receiving portion 51b is high. On the contrary, when the code portion 50a is not between the light emitting portion 51a and the light receiving portion 51b, the light receiving portion 51b receives the projected light from the light emitting portion 51a and the output of the light receiving portion 51b is low.

Figure 7:
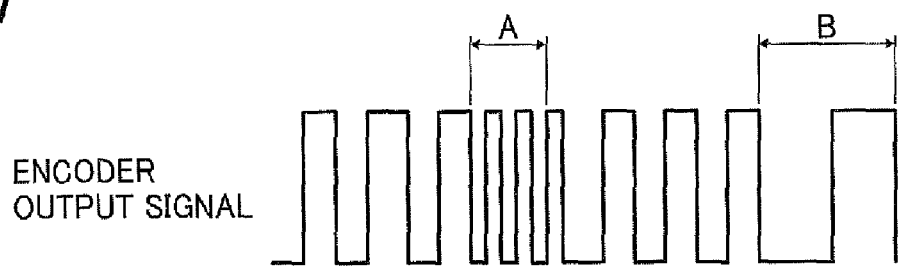
FIG. 7 is a schematic diagram illustrating an example of an output signal of the rotary encoder.

Accordingly, rotation of the driven roller 47 (or the rotary disk 50) is detected in accordance with the size of intervals of a waveform of an encoder output signal, as illustrated in FIG. 7. The encoder output signal is a signal after the output of the photosensor 51 is converted. FIG. 7 is a diagram illustrating one example of the output signal of the rotary encoder.

In particular, when the size of intervals of the waveform of the encoder output signal is relatively small as indicated by A in FIG. 7, the controller 80 serving as a rotation detector recognizes that the speed of rotation of the driven roller 47 or the rotary disk 50 is fast. By contrast, when the size of intervals of the encoder output signal is relatively large as indicated by B in FIG. 7, the controller 80 recognizes that the speed of rotation of the driven roller 47 or the rotary disk 50 is slow.

Information associated with rotation of the driven roller 47 recognized by the controller 80 is feedback to the drive motor 41 shown in FIG. 3. That is, if the controller 80 determines that the speed of rotation of the driven roller 47 is relatively slow, the drive speed of the drive motor 41 is accelerated. By contrast, if the controller 80 determines that the speed of rotation of the driven roller 47 is relatively fast, the drive speed of the drive motor 41 is reduced. With this configuration, the moving speed of the transfer belt 40 of the transfer belt unit 30 is stabilized, thereby preventing misalignment of the color toner images when the toner images of different colors are overlappingly transferred.

When the center of rotation of the rotary disk 50 and the center of the code portion 50a (radial scale) are not properly aligned, a rotation error occurs, deteriorating the detection accuracy of the rotation speed. Thus, it is necessary to determine an amount and the direction of misalignment (eccentricity) of the center of the code portion of the rotary disk and the center of the hole with precision, thereby facilitating a failure analysis in short time when a problem occurs.

A detailed description is now provided of a measurement method of measuring the amount and the direction of eccentricity of the rotary disk of the rotary encoder.

Embodiment 1

Figure 8:
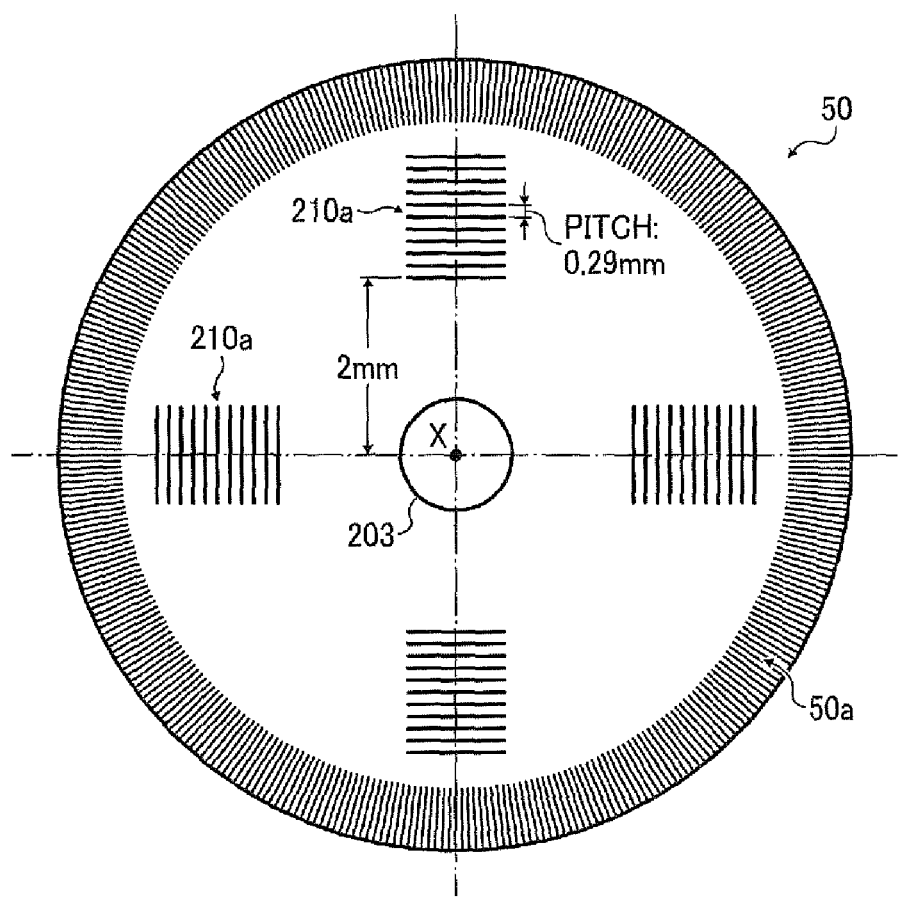
FIG. 8 is a schematic diagram illustrating the rotary disk according to a first embodiment of the present invention.

With reference to FIG. 8, a description is provided of the rotary disk 50 according to the illustrative embodiment of the present invention. FIG. 8 is a schematic diagram illustrating the rotary disk 50.

According to the present illustrative embodiment, the rotary disk 50 is formed of transparent flexible material such as polyethylene terephthalate (PET) with a thickness of approximately 0.2 mm. A code portion 50a is formed on the circumference side of the main surface of the rotary disk 50.

The outer diameter of the rotary disk 50 is approximately 15.5 mm. The diameter of a hole 203 serving as a connecting portion that connects to the rotary shaft of a measured object is approximately 3 mm (radius: 1.5 mm). Groups of straight-line patters 210a are formed in a radial direction.

The base point of the straight-line pattern groups 210a is positioned 2 mm radius from the center X of the code portion 50a. Each of the straight-line pattern groups 210a consists of a total of 11 straight lines that are equally spaced at a pitch of 0.29 mm in the radial direction and drawn toward the peripheral direction.

According to the illustrative embodiment, the straight-line pattern group 210a is formed at four places on the rotary disk 50 in a cruciform direction, for example. The center thereof is indicated as X in FIG. 8.

The center of the straight-line pattern groups 210a relative to the rotary disk 50 and the center of the code portion 50a are aligned on a micron level with precision. The straight-line pattern groups 210a and the code portion 50a are simultaneously formed using the pattern drawing technique such as the photolithography, the photoresist, and etching as described above.

The hole 203 is formed such that the center of the hole 203 is aligned with the center of the code portion 50a and the center of the straight-line pattern groups 210a after the straight-line patterns 210a are formed. In order to find out deviation of the center of the hole 203 relative to the center of the code portion 50a and the center of the straight-line pattern groups 210a, a measuring device 220 as illustrated FIG. 9 is used.

Figure 9:
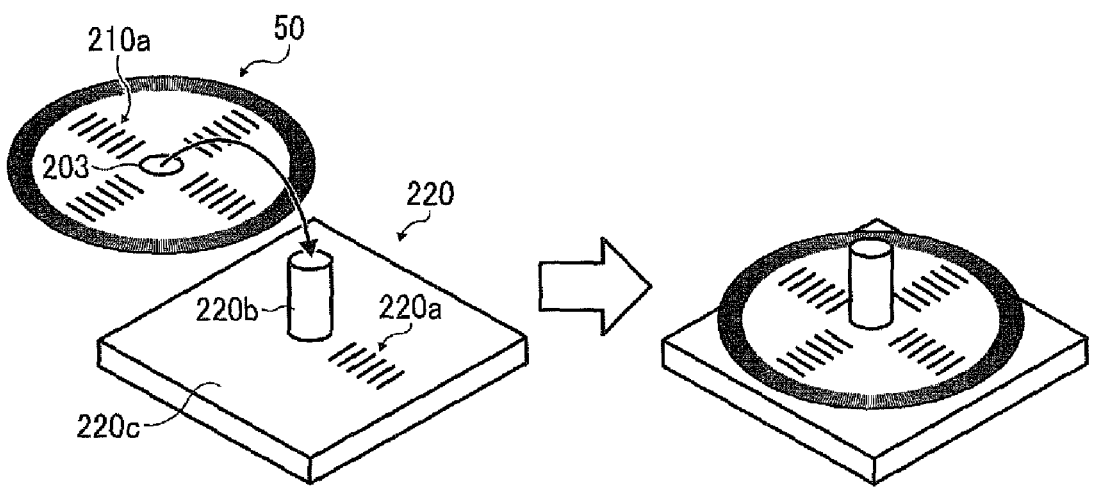
FIG. 9 is a schematic diagram illustrating a measuring device that measures eccentricity of the rotary disk.
Figure 10:
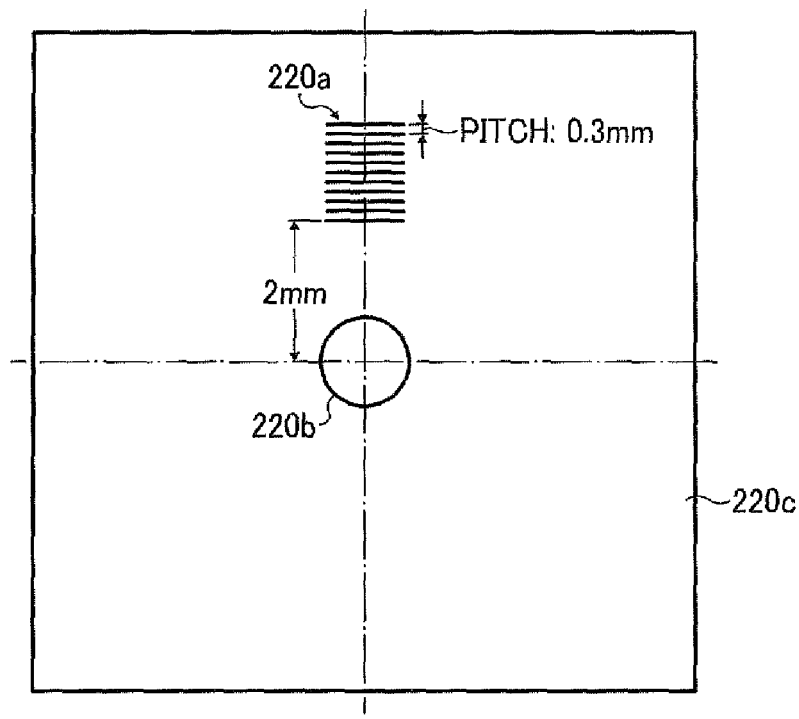
FIG. 10 is a plan view of the measuring device of FIG. 9.

Referring now to FIG. 9, there is provided a schematic diagram illustrating the measuring device 220 that measures the positional deviation of the center of the hole 203. FIG. 10 is a top schematic view of the measuring device 220.

As illustrated in FIG. 9, a projection 220b is provided on a table 220c. The hole 203 of the rotary disk 50 is fitted with the projection 220b so as to place the rotary disk 50 on the table 220c.

Figure 11:
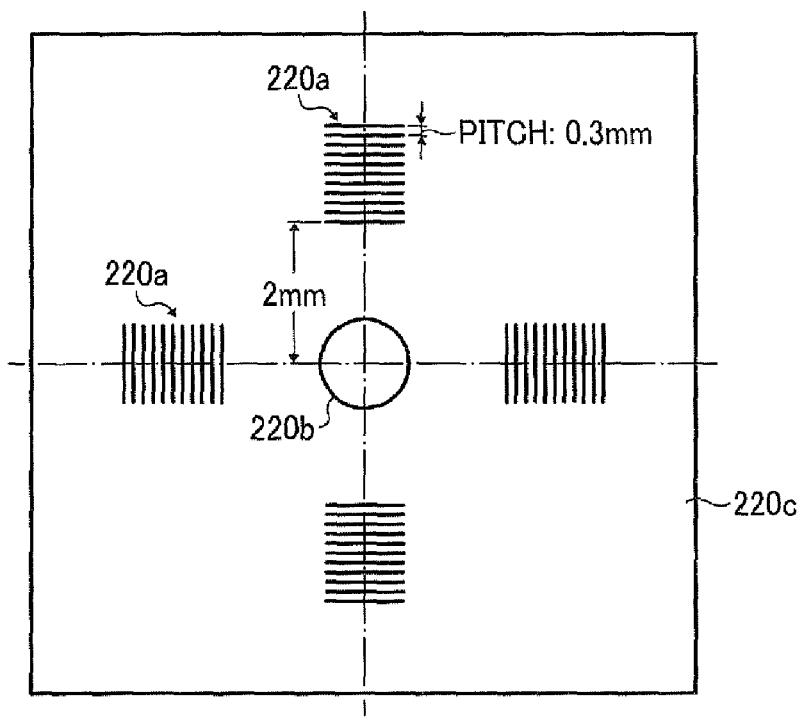
FIG. 11 is a schematic diagram illustrating another example of the measuring device.

Another example of the measuring device 220 is illustrated in FIG. 11.

As illustrated in FIG. 11, the straight-line pattern groups 220a are formed at four places in the cruciform direction on the table 220c. The straight-line pattern groups 220a need to be formed in the same direction as that of the straight-line pattern groups 210a.

The diameter of the projection 220b is approximately 3 mm (Radius: 1.5 mm). The straight-line pattern groups 220a are formed on the table 220c and different from the straight-line pattern groups 210a of FIG. 8. The base point of the straight-line pattern groups 220a is positioned 2 mm radius from the center of the outer diameter of the projection 220b. The base point of the straight-line pattern groups 220a is at the same position as that of the straight-line pattern groups 210a.

Each of the straight-line pattern groups 220a on the table 220c consists of a total of 11 straight lines that are equally spaced at the pitch of 0.30 mm in the same direction as that of the straight-line pattern groups 210a of the rotary disk 50 and drawn toward the peripheral direction.

Figure 12:
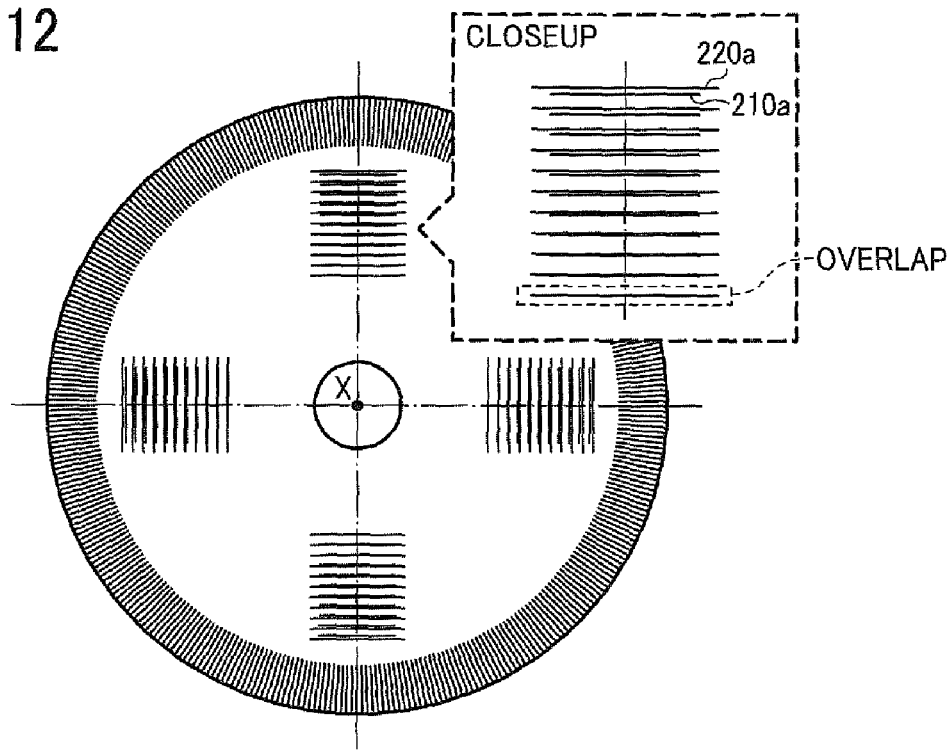
FIG. 12 is a plan view of the measuring device of FIG. 11 on which the rotary disk of FIG. 8 is placed.

Referring now to FIG. 12, there is provided a top schematic view of the measuring device 220 on which the rotary disk 50 shown in FIG. 8 is set. The rotary disk 50 is set on the measuring device 220 such that the straight-line pattern groups 210a of the rotary disk 50 and the straight-line pattern groups 220a are parallel with each other.

Next, a description is provided of the measurement of deviation of the position of the center of the hole 203 relative to the code portion 50a.

As illustrated in FIG. 4, the rotary disk 50 is positioned in accordance with the outer shape of the shaft 47a with a diameter of 3 mm. Therefore, the diameter of the projection 220b of the measurement device 220 is also 3 mm so as to prevent rattling in the radial direction when the rotary disk 50 is fixed to the projection 220b.

FIG. 12 illustrates the measuring device 220 on which the rotary disk 50 of FIG. 8 is set without deviation of the position of the center of the hole 203 relative to the code portion 50a.

The positional relation of the straight-line pattern groups 210a and 220a can be easily read by using a loupe with a magnification of approximately 10× to 15×. According to the illustrative embodiment, the loupe manufactured by Peak Co., Ltd. Is used.

As illustrated in FIG. 12, the position of the base point of the straight-line pattern group 210a on the rotary disk 50 and the position of the base point of the straight-line pattern group 220a on the measuring device 220, that is, the position 2 mm radius from the center of the code portion 210a, are aligned. Therefore, it is possible to read/understand easily that misalignment of the position of the center of the hole 203 relative to the code portion 50a hardly exists.

Figure 13:
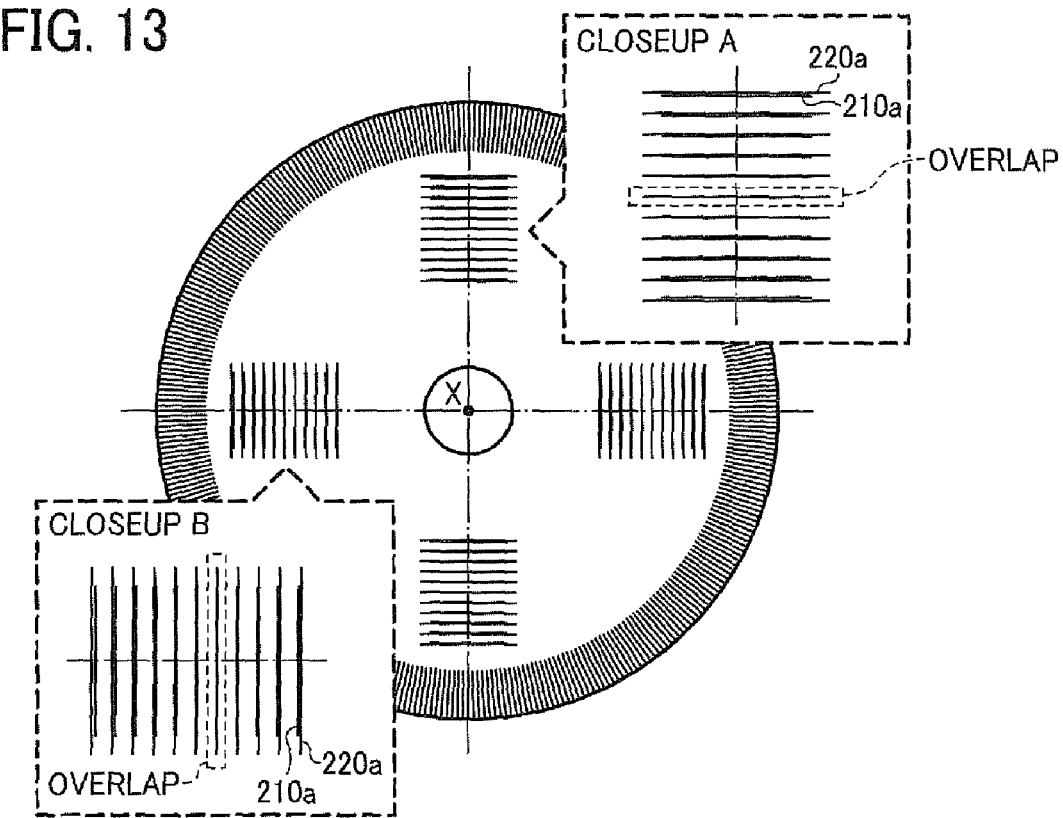
FIG. 13 a schematic diagram illustrating one example of a case in which a hole of the rotary disk deviates from the center of a code portion.

Referring now to FIG. 13, there is provided a schematic diagram illustrating one example of a case in which the hole 203 of the rotary disk 50 deviates from the center of the code portion 50a.

In this example, the distance between one end of the straight-line pattern group 210a of the rotary disk 50 and the other end thereof is 2.9 mm (the pitch is 0.29 mm) as illustrated in FIG. 8. The distance between one end of the straight-line pattern group 220a on the table 220c of the measuring device 220 and the other end is 3 mm (the pitch is 0.3 mm) as illustrated in FIGS. 10 and 11. Thus, the difference between the distance of the straight-line pattern group 210a and the straight-line pattern group 220a is 0.1 mm, and the resolution of 0.01 mm is obtained by dividing the difference in the distance, that is, 0.1 mm, by 10.

Based on the positional relation of the straight-line pattern groups 210a and 220a in FIG. 13, it can be confirmed that one of the straight lines in the straight-line pattern group 210a of the rotary disk 50 overlaps with the sixth line of the straight lines in the straight-line pattern group 220a on the table 220c as illustrated in a closeup A in FIG. 13. In this example, as illustrated in FIG. 13, the hole 203 of the rotary disk 50 is processed deviating upward by 0.05 mm (0.01 mm×5=0.05 mm).

Similarly, as illustrated in a closeup B in FIG. 13, the hole 203 of the rotary disk 50 is processed deviating in the right direction by 0.04 mm (0.01×4=0.04 mm).

According to the measuring technique of the present invention as described above, the plurality of the straight-line pattern groups including equally spaced straight lines is formed on the rotary disk of the rotary encoder and placed on the measuring device that includes the plurality of straight-line pattern groups including equally spaced straight lines having a different pitch from the pitch of the straight-line groups of the rotary disk of the rotary encoder. The amount of deviation between the straight-line pattern groups is measured by using the loupe or the like.

With this configuration, the amount of deviation between the center of the code portion of the rotary disk (i.e., a pulse code wheel) and the center of the hole can be easily measured in short time by anyone and anywhere by using a loupe or the like. In other words, the amount of deviation can be measured easily without using a special facility equipped with a microscope or a projector.

Furthermore, according to the illustrative embodiment, two or more straight-line patterns are provided within the rotary disk, thereby facilitating recognition of the direction of deviation of the center of the code portion of the rotary disk and the center of the hole. With this configuration, even if there is an error in manufacturing of the rotary disk, an analysis of the error can be performed easily within short time. In addition, quality management and/or a problem analysis of a motor, a motor conveyance device, an image forming apparatus, and so forth equipped with the rotary encoder with the rotary disk of the present invention can be performed easily and in short time.

The foregoing description pertains to the illustrative embodiment of the present invention. However, the size of the pitch and the number of the straight-line pattern groups are not limited to the configuration described above.

Embodiment 2

Figure 14:
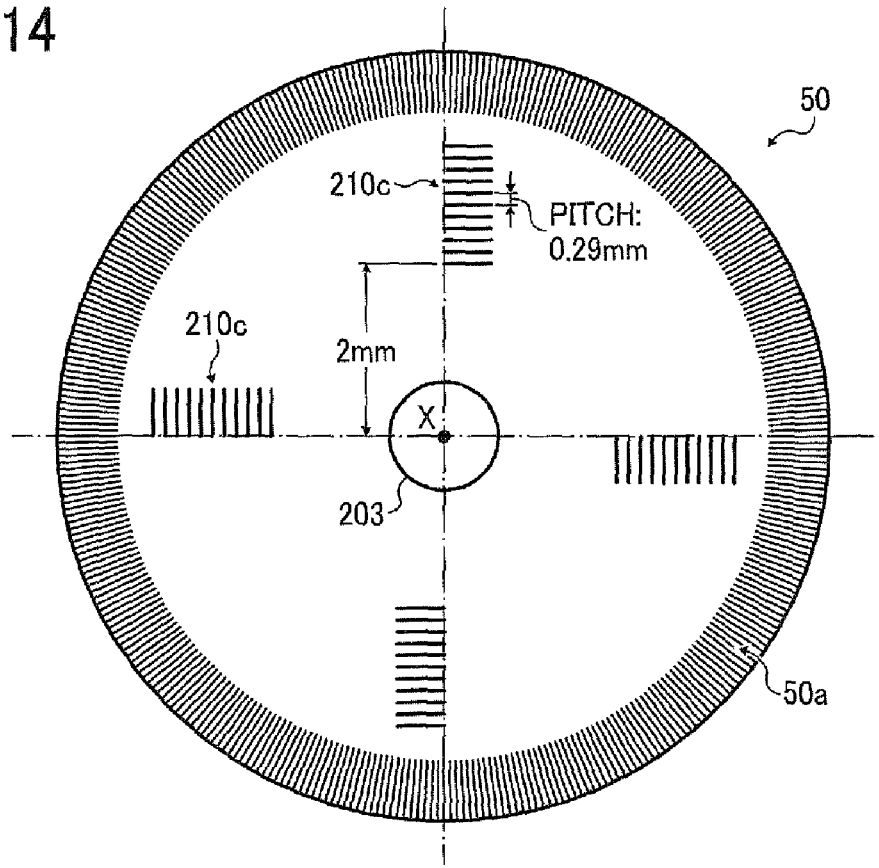
FIG. 14 is a schematic diagram illustrating the rotary disk according to a second embodiment of the present invention.

Referring now to FIG. 14, there is provided a schematic diagram illustrating the rotary disk 50 according to another embodiment of the present invention. The outer diameter of the rotary disk 50 is approximately 15.5 mm, and the diameter of the hole 203 is approximately 3 mm (Radius: 1.5 mm). FIG. 14 also shows straight-line pattern groups 210*c*.

According to the present illustrative embodiment, the base point of the straight-line pattern groups 210*c* is positioned 2 mm radius from the center X of the code portion 50*a*. The straight-line pattern group 210*c* consists of a total of 11 straight lines that are equally spaced at the pitch of 0.3 mm in the radial direction and drawn toward the peripheral direction.

Figure 15:
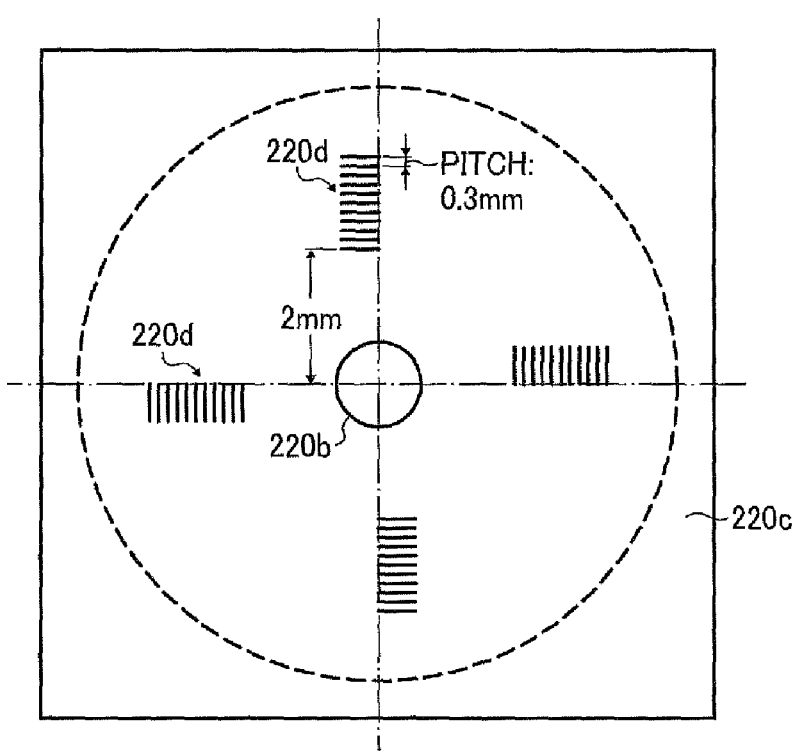
FIG. 15 is a schematic diagram illustrating patterns of the measuring device according to the second embodiment of the present invention.

The projection 220*b* of the measuring device 220 has a diameter of 3 mm (Radius: 1.5 mm). As illustrated in FIG. 15, on the surface of the table 220*c*, straight-line pattern groups 220*d* different from the foregoing straight-line pattern groups as illustrated in FIGS. 10 and 11, for example, are formed. FIG. 15 is a schematic diagram illustrating the straight-line pattern groups 220*d* of the measuring device 220.

The base point of the straight-line pattern groups 220*d* is positioned 2 mm radius from the center of the outer diameter of the projection 220*b*. Each of the straight-line pattern groups 210*d* consists of a total of 11 straight lines that are equally spaced at the pitch of 0.30 mm in the radial direction and drawn in the peripheral direction.

Figure 16:
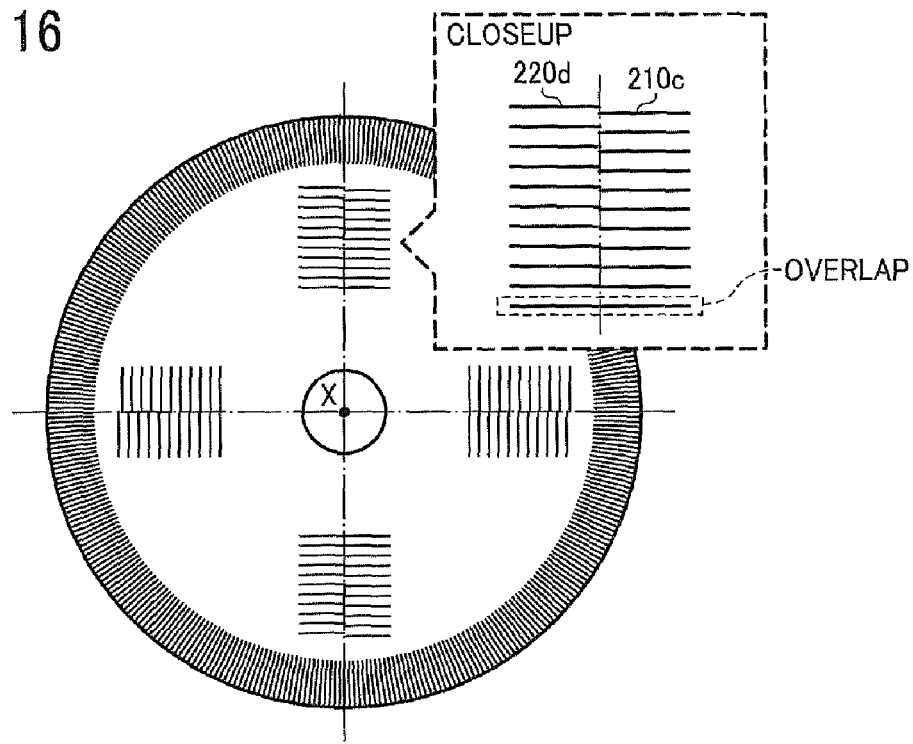
FIG. 16 is a top schematic view of the measuring device of FIG. 15 on which the rotary disk of FIG. 14 is placed.

Referring now to FIG. 16, there is provided a top schematic view of the measuring device 220 of FIG. 15 on which the rotary disk 50 of FIG. 14 is set. The rotary disk 50 is set on the measuring device 220 such that the straight-line pattern groups 210*c* of the rotary disk 50 and the straight-line pattern groups 220*d* of the measuring device 220 are parallel with each other.

According to the present illustrative embodiment, the straight-line pattern groups 210*c* and the straight-line pattern groups 220*d* are configured such that when the rotary disk 50 is set on the table 220*c*, the straight-line pattern groups 210*c* and the straight-line pattern groups 220*d* do not overlap with each other, thereby allowing the positional deviation of the center of the hole 203 relative to the code portion 50*a* to be easily seen.

Figure 17:
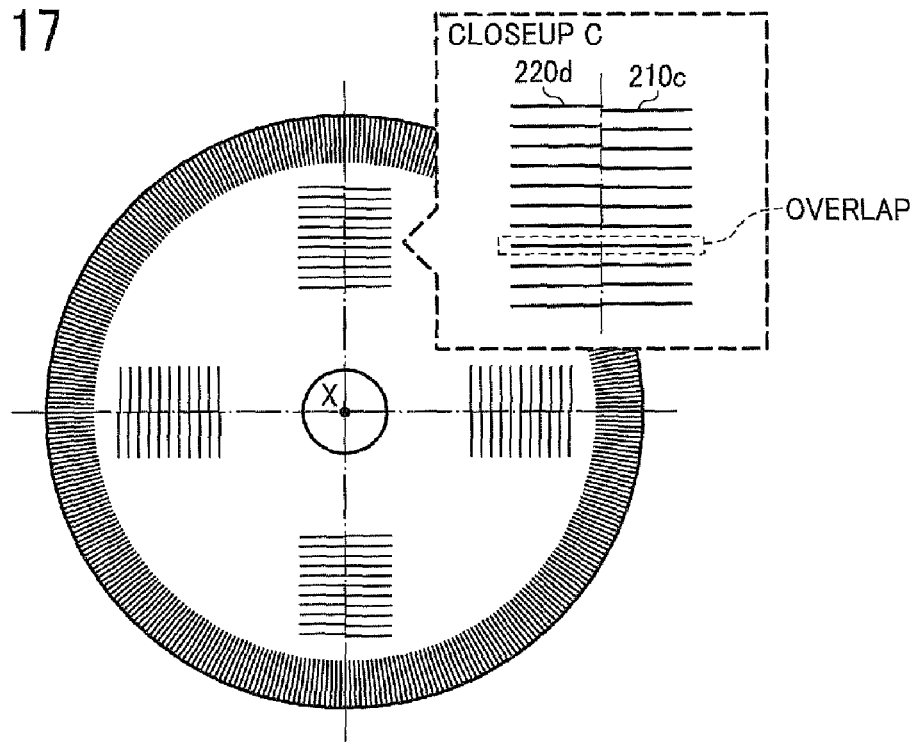
FIG. 17 is a schematic diagram illustrating another example of a case in which the hole of the rotary disk deviates from the center of the code portion.

Referring now to FIG. 17, there is provided a schematic diagram illustrating one example of a case in which the hole 203 of the rotary disk 50 deviates from the center of the code portion 50*a*. As can be seen in a closeup C, the hole 203 of the rotary disk 50 deviates in a downward direction in FIG. 17 by 0.03 mm (0.01 mm×3=0.03 mm).

With this configuration, the amount of deviation between the center of the code portion of the rotary disk (i.e., a pulse code wheel) and the center of the hole can be easily measured in short time by anyone and anywhere by using a loupe or the like. In other words, the amount of deviation can be measured without using a special facility equipped with a microscope or a projector.

Furthermore, according to the illustrative embodiment, the rotary disk includes two or more straight-line patterns, thereby being able to recognize the direction of deviation of the center of the code portion of the rotary disk and the center of the hole.

Embodiment 3

Figure 18:
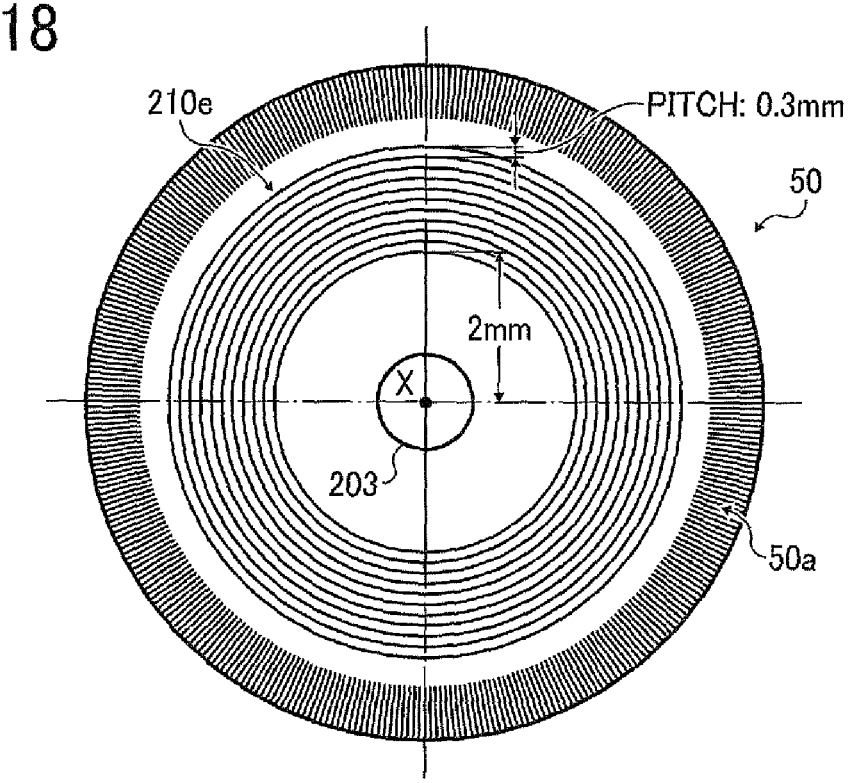
FIG. 18 is a schematic diagram illustrating the rotary disk according to a third embodiment of the present invention.

Referring now to FIG. 18, there is provided a schematic diagram illustrating the rotary disk 50 according to still another embodiment of the present invention.

According to the present illustrative embodiment, a circular pattern group 210*e* is formed on the rotary disk 50.

The diameter of the inner most circle of the circular pattern group 210*e* is 4 mm (Radius: 2 mm). The circular pattern group 210*e* includes a total of 11 circular patterns that are equally spaced at the pitch of 0.6 mm in diameter (0.3 mm in radius) toward the peripheral direction (radial direction).

The center of the circular pattern group 210*e* precisely coincides with the center X of the code portion 50*a* on micron level. The circular pattern group 210*e* and the code portion 50*a* are formed simultaneously using the pattern drawing technique such as photolithography, photoresist, and etching.

The hole 203 is processed such that the center of the hole 203 coincides with the center of the code portion 50*a* and the center of the circular pattern group 210*e* after the circular pattern group 210*e* is formed.

Similar to the foregoing embodiments, on the table 220*c* of the measuring device, 11 circular patterns are formed at the pitch of 0.3 mm from the base point 2 mm radius from the center of the outer diameter of the projection. The rotary disk 50*a* is placed on the table 220*c* of the measuring device so as to overlay on the pattern groups of the table 220*c*, thereby being able to measure the amount of deviation between the circular patterns by using the loupe or the like.

With this configuration, the amount of deviation and the direction of deviation between the center of the code portion of the rotary disk (i.e., a pulse code wheel) and the center of the hole can be easily measured in short time by anyone and anywhere without using a special facility equipped with a microscope or a projector.

In particular, since the patterns of the present illustrative embodiment are circular, it is not necessary to align the patterns of the rotary disk and the patterns of the table when the rotary disk is set on the table so that the direction of the positional deviation of the center of the code portion of the rotary disk and the center of the hole can be accurately recognized with ease.

Embodiment 4

Figure 19:
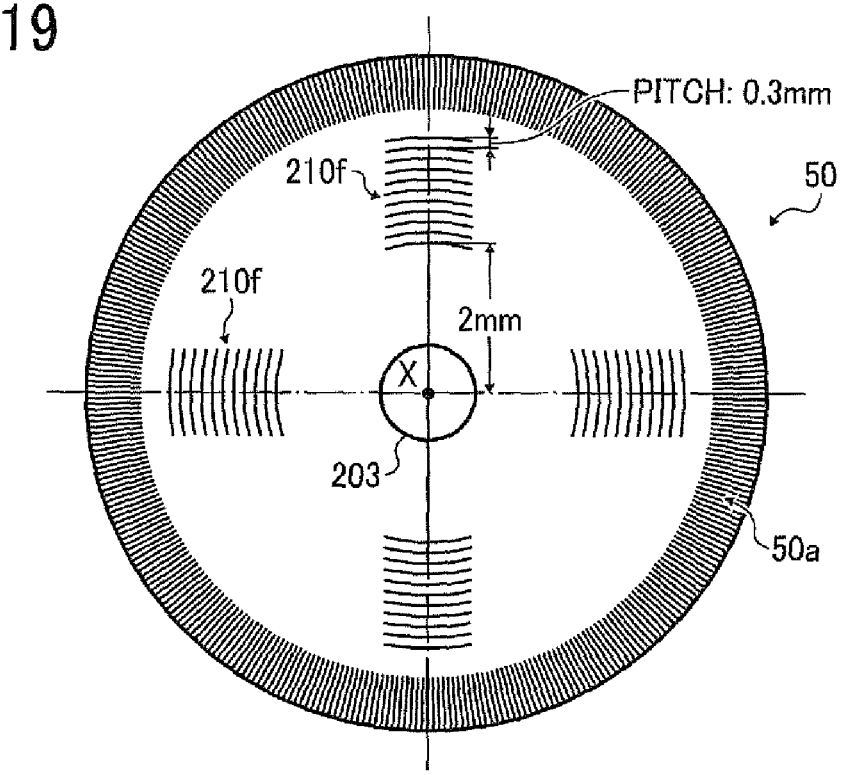
FIG. 19 is a schematic diagram illustrating the rotary disk according to a fourth embodiment of the present invention.
Figure 20:
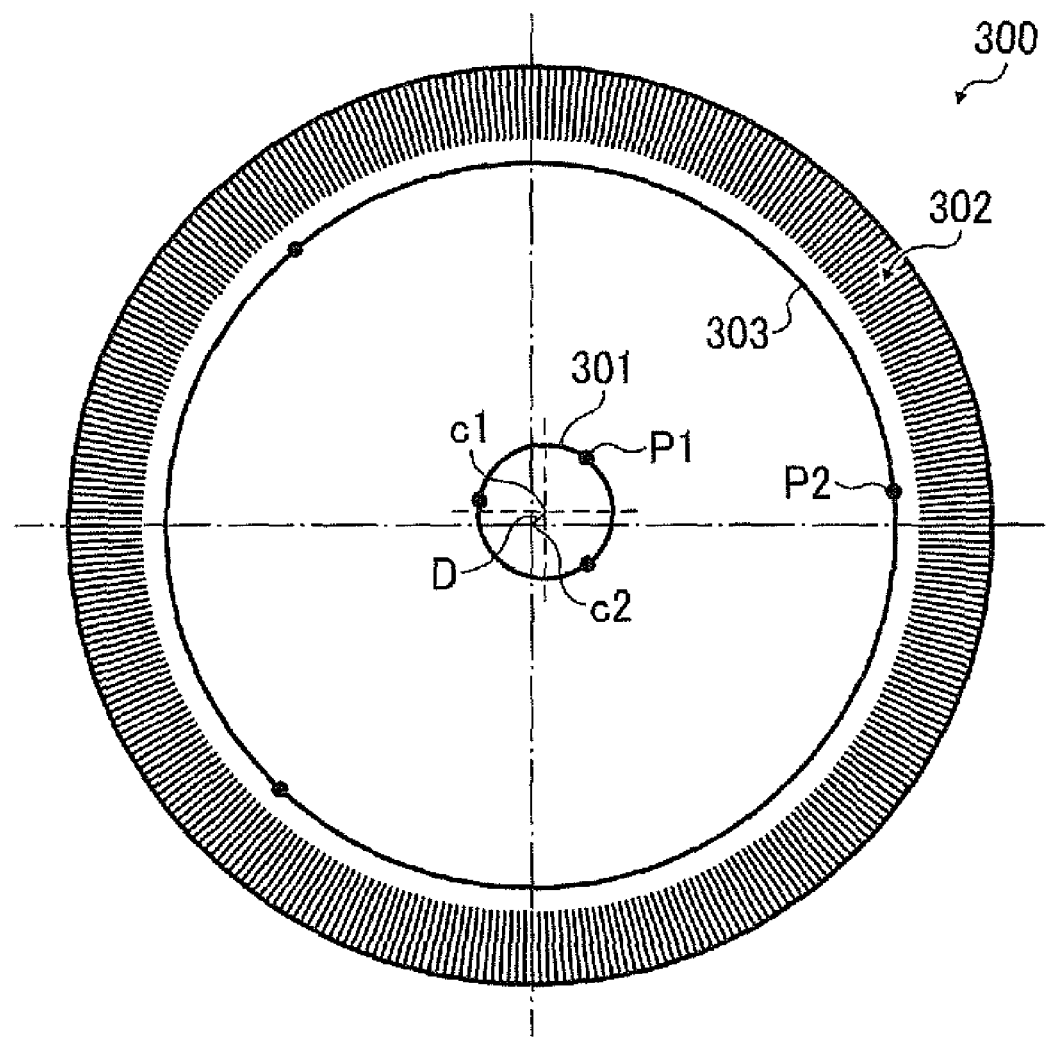
FIG. 20 is a schematic diagram illustrating a related-art measuring method of eccentricity of a rotary disk after processing.

Referring now to FIG. 19, there is provided a schematic diagram illustrating the rotary disk 50 according to yet still another embodiment of the present invention. According to the present illustrative embodiment, the rotary disk 50 includes arc-shape pattern groups 210*f*.

Each of the arc-shape pattern groups 210*f* consists of a total of 11 arc-shape patterns. The diameter of the inner most circle of the arc-shape pattern 210*f* is 4 mm (Radius: 2 mm). 11 arc-shape patterns are equally spaced at the pitch of 0.6 mm in diameter (0.3 mm in radius) toward the peripheral direction (radial direction).

Similar to the foregoing embodiments, the center of the arc-shape pattern groups 210*f* precisely coincides with the center of the code portion 50*a* on micron level. Furthermore, similar to the foregoing embodiments, on the table 220*c* of the measuring device, 11 arc-shape patterns are formed at the pitch of 0.3 mm from the base point 2 mm radius from the center of the outer diameter of the projection. The rotary disk 50*a* is placed on the table 220*c* of the measuring device so as to overlay on the pattern groups of the rotary disc 50*a* on the pattern groups of the table 220*c*, thereby being able to measure the amount of deviation between the arc-shape patterns by using the loupe or the like.

With this configuration, the amount and the direction of deviation between the center of the code portion 50*a* of the rotary disk (i.e., a pulse code wheel) and the center of the hole can be easily measured in short time by anyone and anywhere without using a special facility equipped with a microscope or a projection equipment.

Furthermore, since the rotary disk includes two or more arc-shape patterns, it is easy to recognize the direction of deviation between the center of the code portion of the rotary disk and the center of the hole.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, or system.

For example, any of the aforementioned methods may be embodied in the form of a system or device, including, but not limited to, any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An eccentricity measurement method of measuring eccentricity between a center of a radial scale of a rotary disk formed around a peripheral portion of the rotary disk and a center of a connection portion of the rotary disk for connecting the rotary disk to a rotary shaft of a measured object, the eccentricity measurement method comprising:

forming, on the rotary disk, at least one first straight-line pattern group in different radial directions, the first straight-line pattern group including a plurality of straight-line patterns equally spaced radially and extending in a normal line direction from a base point a predetermined distance away from the center of the radial scale;

forming, on a table comprising a projection that engages the connection portion of the rotary disk, at least one second straight-line pattern group, the second straight-line pattern group including the same number of the plurality of straight-line patterns as the straight-line patterns of the first straight-line pattern group in the same radial direction as that of the first straight-line pattern group from a base point the predetermined distance away from the center of an outer diameter of the projection at a pitch different from the pitch of the first straight-line pattern group;

placing the rotary disk on the table such that the first straight-line pattern group and the second straight-line pattern group on the table are parallel to each other; and measuring an amount and direction of the eccentricity of the rotary disk using the position of the straight-line pattern of the first straight-line pattern group that coincides with the position of the straight line pattern of the second straight-line pattern group in the radial direction, wherein a central portion of the rotary disk includes the connection portion.

2. A rotary encoder, comprising:

a rotary disk, an eccentricity amount of which is measured by the eccentricity measuring method of claim 1;

a light projection device to direct light onto the rotary disk;

a light detection device to detect light transmitted through a radial scale provided to the rotary disk; and a rotation detection device to detect a rotational state of the rotary disk in accordance with a result of the detection provided by the light detection device.

3. A motor comprising the rotary encoder of claim 2.

4. A belt conveyance device, comprising:

a plurality of rollers;

a rotary belt stretched and supported between the plurality of rollers; and the rotary encoder of claim 2.

5. An image forming apparatus for forming an image, comprising:

an image bearing member to bear an electrostatic latent image on a surface thereof;

a developing device to develop the electrostatic latent image formed on the image bearing member into a toner image using toner;

a transfer device to transfer the toner image onto a recording medium;

a fixing device to fix the toner image on the recording medium; and the rotary encoder of claim 2.

6. An eccentricity measurement method of measuring eccentricity between a center of a radial scale of a rotary disk formed along a peripheral portion of the rotary disk and a center of a connection portion of the rotary disk for connecting the rotary disk to a rotary shaft of a measured object, the eccentricity measurement method comprising:

forming, on the rotary disk, a plurality of equally spaced first circle patterns concentric with the radial scale from a base point a predetermined distance away from the center of the radial scale;

forming, on a table comprising a projection that engages the connection portion of the rotary disk, the same number of second circle patterns as that of the first circle patterns, concentric with the first circle patterns at a pitch different from the pitch of the first circle patterns from a base point the predetermined distance away from the center of an outer diameter of the projection;

placing the rotary disk on the table; and measuring an amount and direction of the eccentricity of the rotary disk using the position of the first circle pattern that coincides with the second circle pattern, wherein a central portion of the rotary disk includes the connection portion.

7. A rotary encoder, comprising:

the rotary disk, an eccentricity amount of which is measured by the eccentricity measuring method of claim 6;

a light projection device to direct light onto the rotary disk;

a light detection device to detect light transmitted through a radial scale provided to the rotary disk; and a rotation detection device to detect a rotational state of the rotary disk in accordance with a result of the detection provided by the light detection device.

8. A motor comprising the rotary encoder of claim 7.

9. A belt conveyance device, comprising:

a plurality of rollers;

a rotary belt stretched and supported between a plurality of the plurality of rollers; and the rotary encoder of claim 7.

10. An image forming apparatus for forming an image, comprising:

an image bearing member configured to bear an electrostatic latent image on a surface thereof;

a developing device configured to develop the electrostatic latent image formed on the image bearing member into a toner image using toner;

a transfer device configured to transfer the toner image onto a recording medium;

a fixing device configured to fix the toner image on the recording medium; and the rotary encoder of claim 7.

11. An eccentricity measurement method of measuring an eccentricity between a center of a radial scale of a rotary disk formed at a peripheral portion of the rotary disk and a center of a connection portion of the rotary disk for connecting the rotary disk to a rotary shaft of a measured object, the eccentricity measurement method comprising:

forming, on the rotary disk, at least one first arc-shape pattern group in different radial directions, the first arc-shape pattern group including a plurality of arc-shape patterns equally spaced radially and extending in a normal line direction from a base point a predetermined distance away from the center of the radial scale;

forming, on a table comprising a projection that engages the connection portion of the rotary disk, at least one second arc-shape pattern group, the second arc-shape pattern group including the same number of the plurality of the arc-shape patterns as that of the first arc-shape pattern group in the same radial direction as that of the arc-shape patterns of the first arc-shape pattern group at a pitch different from the pitch of the arc-shape patterns of the first pattern group from a base point the predetermined distance away from the center of an outer diameter of the projection;

placing the rotary disk on the table such that the base point of the first arc-shape pattern group coincides with the base point of the second arc-shape pattern group; and measuring an amount and direction of the eccentricity of the rotary disk using the position of the arc-shape pattern of the first arc-shape pattern group in the radial direction that corresponds to the arc-shape pattern of the second arc-shape pattern group, wherein a central portion of the rotary disk includes the connection portion.

12. A rotary encoder, comprising:

a rotary disk, an eccentricity amount of which is measured by the eccentricity measuring method of claim 11;

a light projection device to direct light onto the rotary disk;

a light detection device to detect light transmitted through a radial scale provided to the rotary disk; and a rotation detection device to detect a rotational state of the rotary disk in accordance with a result of the detection provided by the light detection device.

13. A motor comprising the rotary encoder of claim 12.

14. A belt conveyance device, comprising:

a plurality of rollers;

a rotary belt stretched and supported between a plurality of the plurality of rollers; and the rotary encoder of claim 12.

15. An image forming apparatus for forming an image, comprising:

an image bearing member configured to bear an electrostatic latent image on a surface thereof;

a developing device configured to develop the electrostatic latent image formed on the image bearing member using toner to form a toner image;

a transfer device configured to transfer the toner image onto a recording medium;

a fixing device configured to fix the toner image on the recording medium; and the rotary encoder of claim 12.

* * * * *